Feb. 18, 1969

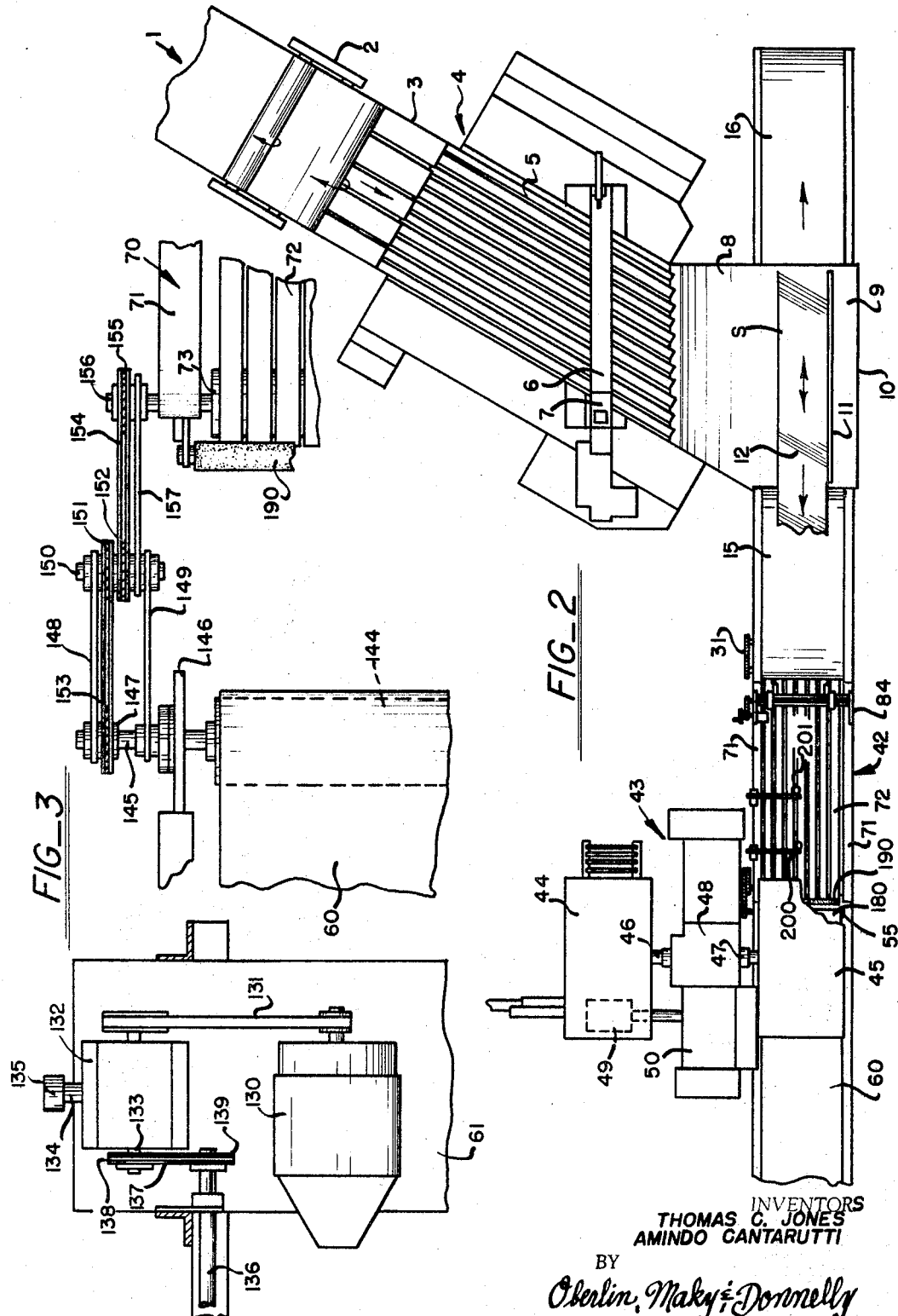

T. C. JONES ET AL 3,428,510

TIRE FABRIC HANDLING APPARATUS

Filed Dec. 26, 1963

INVENTORS
THOMAS C. JONES
ARMINDO CANTARUTTI
BY
Oberlin, Maky & Donnelly
ATTORNEYS

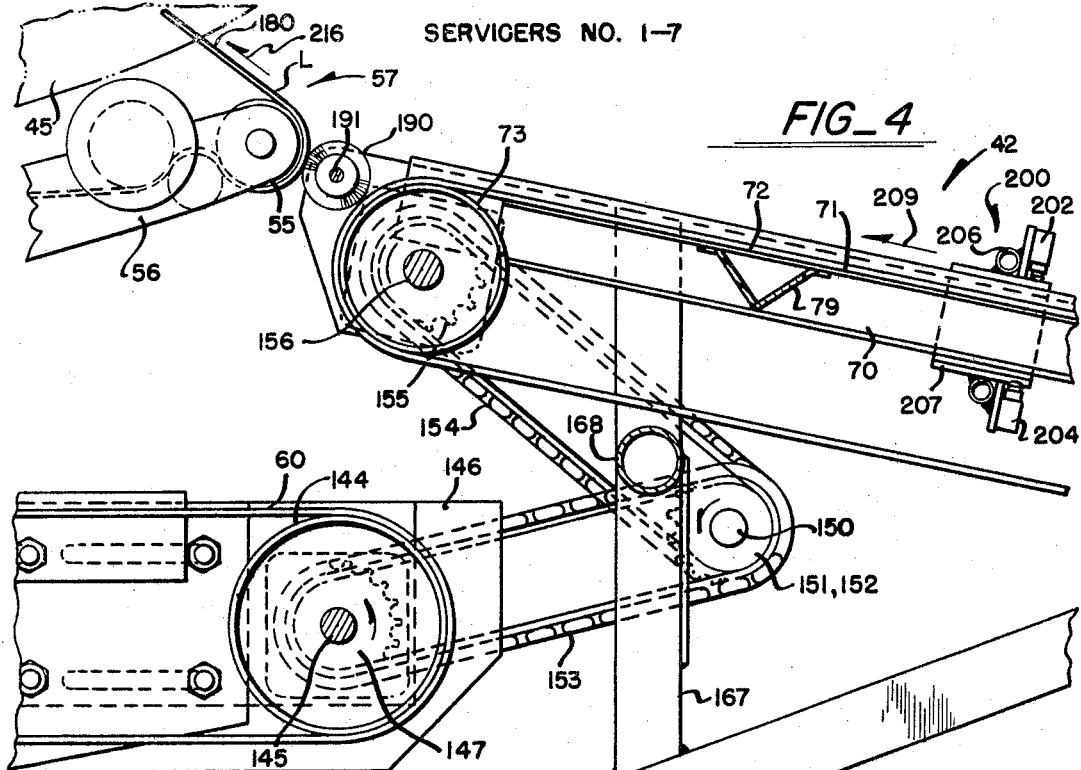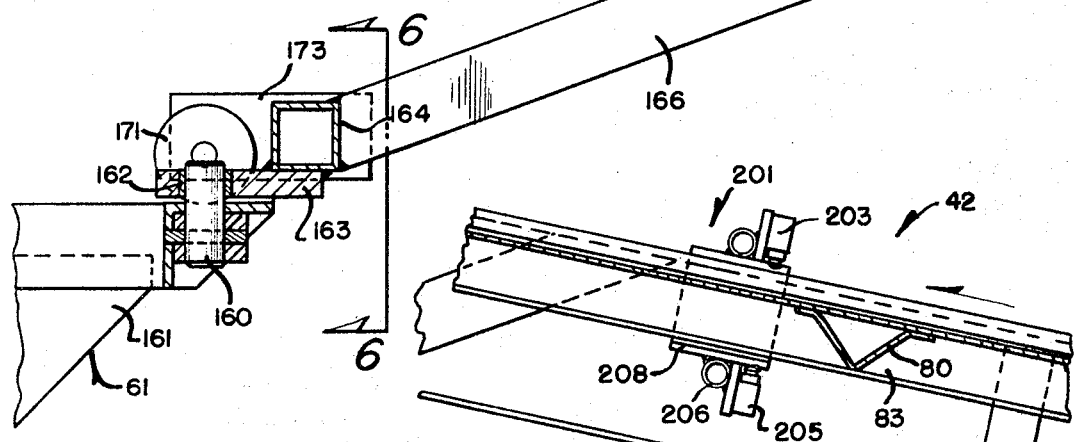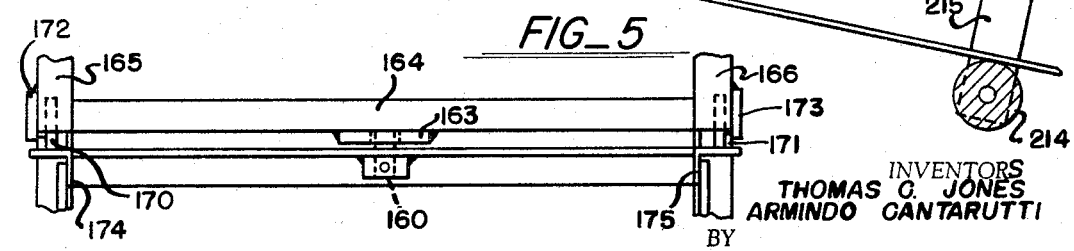

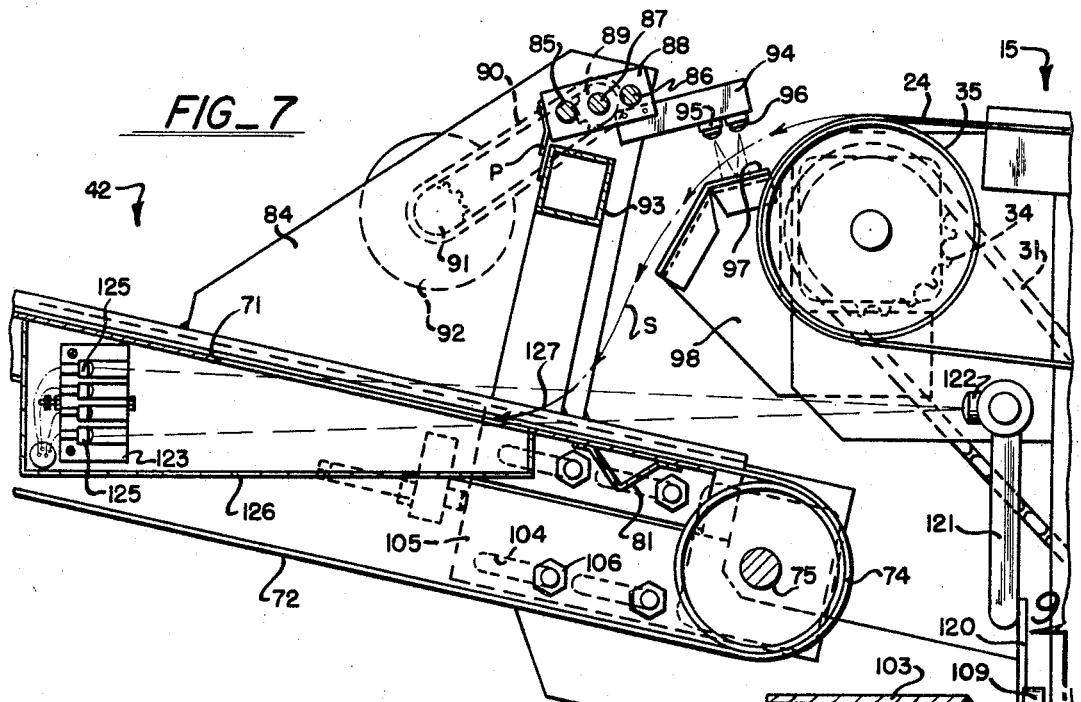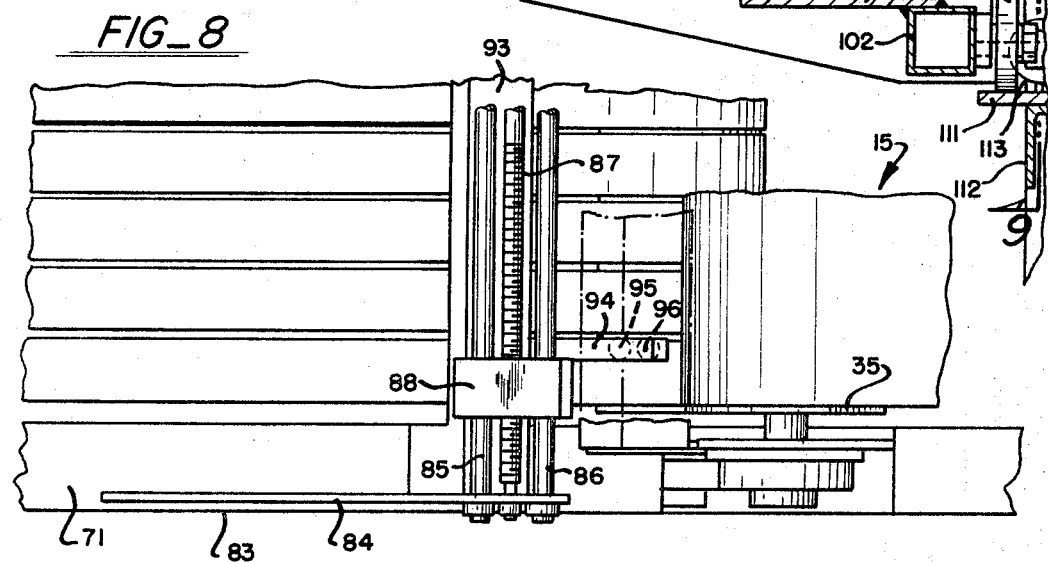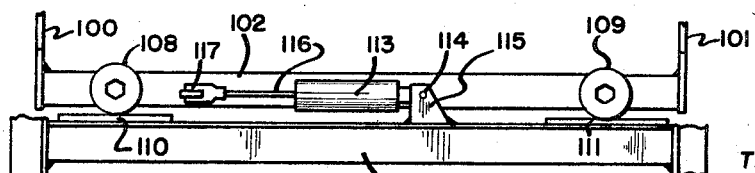

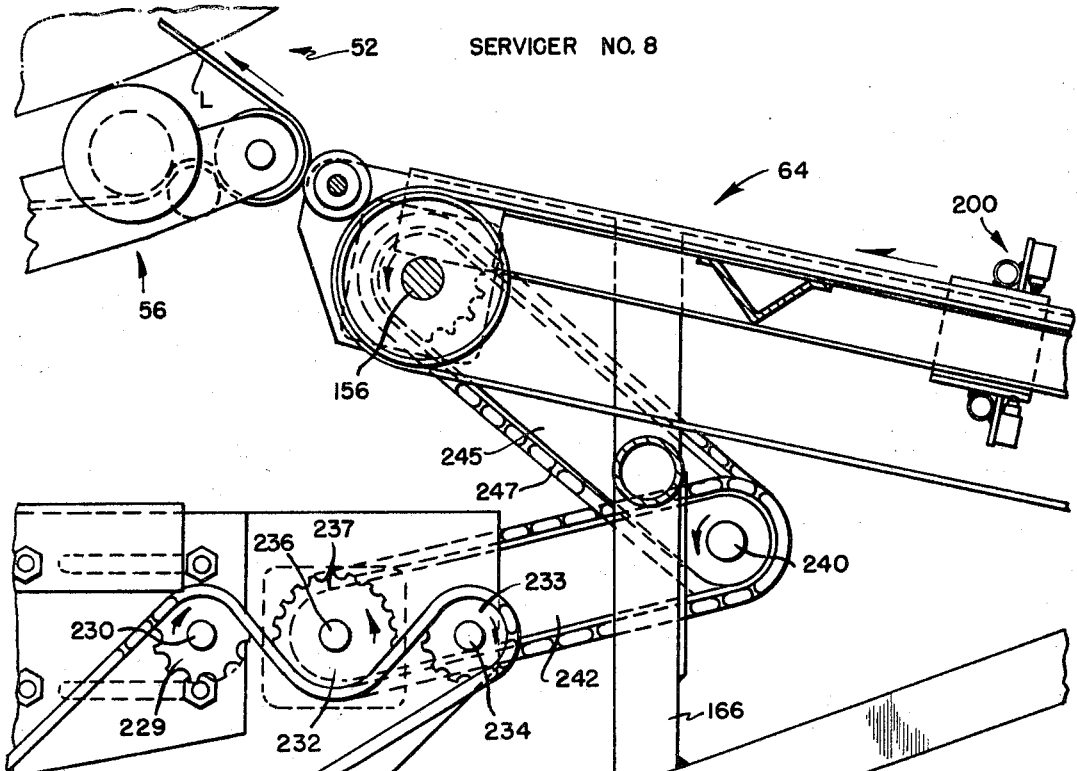
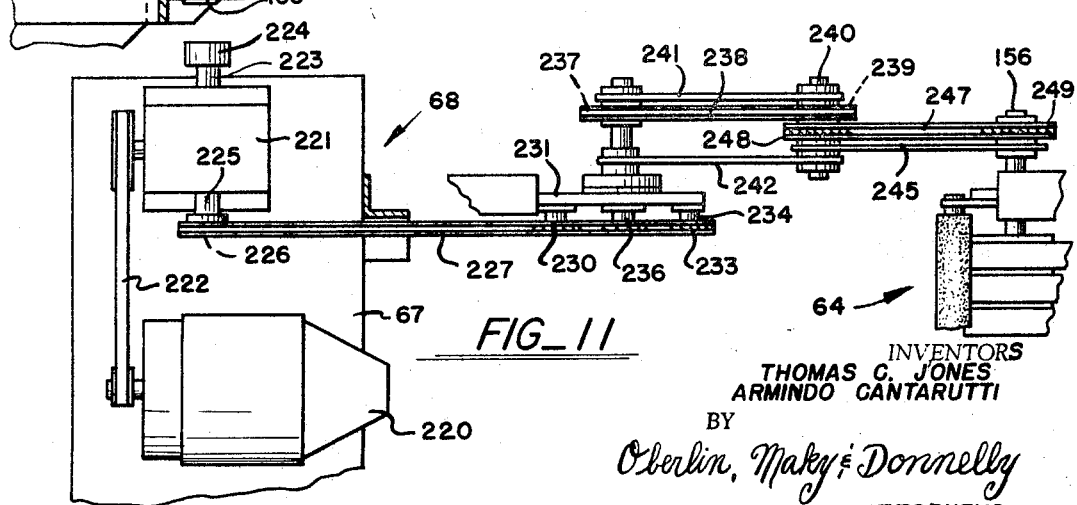
FIG_10
FIG_11
INVENTORS
THOMAS C. JONES
ARMINDO CANTARUTTI
BY
Oberlin, Maky & Donnelly
ATTORNEYS United States Patent Office 3,428,510
Patented Feb. 18, 1969

3,428,510
TIRE FABRIC HANDLING APPARATUS
Thomas C. Jones, Salem, and Armindo Cantarutti, Cuyahoga Falls, Ohio, assignors to NRM Corporation, a corporation of Ohio
Filed Dec. 26, 1963, Ser. No. 333,505
U.S. Cl. 156—406          14 Claims
Int. Cl. B29h 17/02; G05g 15/08

ABSTRACT OF THE DISCLOSURE

Improvements in tire fabric handling and storage apparatus comprising a loading and centering conveyor apparatus for tire servicers for drum type tire building machines wherein the conveyor for each servicer is pivotally mounted on an axis extending through the center of the servicer liner apron which is beyond the end of the conveyor and means for pivoting the conveyor properly to center the fabric and means to control the speed of the conveyor in response to the flexure of the material being deposited thereon.

---

This invention relates generally as indicated to tire fabric handling apparatus and more particularly apparatus for preparing, sorting and storing of tire building materials for convenient access to tire building machines.

The present invention constitutes certain improvements over the apparatus disclosed in the copending application of Edwin E. Mallory and Armindo Cantarutti, entitled, "Tire Building Apparatus," Ser. No. 162,720, filed Dec. 27, 1961, now Patent No. 3,216,879. In such application, there is disclosed a sorting conveyor line extending from a bias cutter to a plurality of tire servicers positioned adjacent tire building machines. For each servicer there is employed a loading conveyor operative to place the fabric in a selected storage drum of the tire sericer when in an elevated position or to by-pass the servicer altogether when in a lowered position. The loading and centering conveyor for each servicer, while nonetheless effective, is highly complex and space consuming requiring a multiude of parts to obtain the alternative loading and bypass positions.

It is accordingly a principal object of the present invention to provide a highly simplified space conserving loading and centering conveyor for tire servicers.

A further principal object is the provision of a sorting conveyor line for tire building materials having a plurality of inclined loading and centering conveyor sections therein, the angle of inclination thereof being fixed.

Another object is the provision of an inclined loading and centering conveyor for a tire servicer having an inclined loading apron which will constitute a substantial planar continuation of such loading apron when in loading position.

Yet another object is the provision of a loading and centering conveyor in a tire building material conveyor line which will have its speed controlled by stock flexure between the line and the entry end of the loading and centering conveyor.

A further object is the provision of a loading and centering conveyor for a tire servicer including an inclined loading apron which will be pivoted about a vertical axis extending through the loading apron at the longitudinal center thereof.

A yet further object is the provision of a horizontally swingable loading and centering conveyor for a tire servicer, the position of which will be controlled by the position of the stock entering such conveyor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGS. 1 and 1A are broken continuations of each other illustrating in side elevation a sorting conveyor line for tire building materials in accordance with the present invention;

FIG. 2 is a fragmentary top plan view of the apparatus shown in FIG. 1;

FIG. 3 is an enlarged fragmentary top plan view of the drive for an intermediate loading and centering conveyor section of the conveyor line somewhat distorted for clarity of illustration;

FIG. 4 is an enlarged fragmentary vertical section taken through the drive or exit end of such intermediate loading conveyor section;

FIG. 5 is an enlarged fragmentary vertical section of the middle of the loading and centering conveyor sections;

FIG. 6 is a fragmentary detailed view taken substantially on the line 6—6 of FIG. 4 on a somewhat reduced scale illustrating the pivot mounting of the exit end of the loading and centering conveyor sections;

FIG. 7 is a fragmentary vertical section similar to FIG. 4 taken through the entry end of the loading and centering conveyor sections;

FIG. 8 is a fragmentary top plan view of the mechanism illustrated in FIG. 7;

FIG. 9 is a fragmentary detail view taken substantially on the line 9—9 of FIG. 7 illustrating the means for swinging the loading and centering conveyor sections;

FIG. 10 is a vertical section similar to FIG. 4 taken through the exit end of the last loading conveyor in the line; and FIG. 11 is a top plan view similar to FIG. 3 illustrating the drive for the last loading conveyor in the line.

Before proceeding with a discussion of the general arrangement of the illustrated embodiment of the present invention, it will be appreciated that cord reinforced tire fabric materials used in the construction of tires is of a very tacky and flimsy nature and, of course, quite difficult to handle. The construction of tire carcasses on the conventional collapsible drum type tire building machine requires the delivery to such drum of many different strips of tire building materials. Such materials must be delivered to the drum in such a manner as to preclude unevenness or stretching of the fabric material which may result in defective tires. Accordingly, it is desirable to apply the fabric material from the servicer or storage reels to the drum type tire building machine at zero tension.

Referring now to the annexed drawings and more particularly to the general arrangement of the illustrated apparatus shown in FIGS. 1, 1A and more particularly FIG. 2, a let-off line assembly indicated generally at 1 may include a plurality of large rolls of cord reinforced tire fabric material mounted on a plurality of uncoiling stands 2 to be payed up inclined conveyor 3 onto a high table bias cutter shown generally at 4. The top of the bias cutter 4 comprises a plurality of conveyor belts 5 which extend beneath a track 6 supporting a cutter 7 thereon for traversing movement across the fabric supported on the belts 5. The ply stock fabric is, of course, of a relatively flimsy nature and the reinforcing cords therein will extend longitudinally of the strip being payed from the let-off line assembly 1. The track 6 may be adjusted so that the angle of the bias cut may be controlled. An accurate sensing mechanism may be employed to determine the length of the fabric material that has passed beneath the cutter to energize the cutter through its complete cycle severing such fabric to the desired width.

The conveyor belts 5 are of different lengths and such belts terminate at the top of a downwardly sloping apron 8 which smoothly curves into the top 9 of splice table 10 against an adjusting bar 11. The stock S which drops down the apron 8 onto the top 9 of the splice table 10 is in the form of a rhomboid or oblique parallelogram and the operator standing in front of the splice table may splice the stock segment thus cut to an adjoining stock segment as indicated at 12 to form an elongated strip of tire fabric material which will have the reinforcing cords therein extending on a predetermined bias angle. The operator standing in front of the splice table 10 may control the let-off line assembly 1 to place upon the high table bias cutter any number of sizes and types of tire fabric material for formation into the elongated strips as indicated.

The operator in front of the splice table 10 may feed the strip of tire material S onto either conveyor 15 extending to his left or conveyor 16 extending to his right. The conveyor 16 may comprise an endless belt trained about pulleys 17 and 18 at each end thereof, the latter being driven by chain 19 trained about sprocket 20 on the shaft thereof. Sheet metal or like material guide 21 extends about the pulley 18 and terminates in sloping surface 22 just above the pulley 23 which constitutes the drive pulley for the endless belt 24 of the conveyor 15.

The belt 24 thus extends inclined downwardly beneath the top 9 of the splice table 10 and also beneath the conveyor 16. The belt 24 is supported on idler pulleys 26, 27 and 28 on the legs of the splice table and the top flight is also supported on a somewhat larger idler pulley 29 adjacent the left hand edge of the top 9 of the splice table as viewed in FIGS. 1 and 2. The other end of the belt 24 is trained about pulley 30 which is driven by drive chain 31 from speed reducer 32 driven by motor 33. The chain 31 may be trained about a sprocket 34 on the axis of the drive pulley 30 and a somewhat smaller sprocket 35 on the speed reducer 32. It can now be seen that the drive motor 33 is effective to drive the belt 24 so that the top flight thereof will move in the direction of the arrow 36 and the chain 19 trained about sprocket 37 on the pulley 23 and idler sprockets 38 and 39 will be effective to rotate the drive pulley 18 of the belt conveyor 16 so that the top flight thereof will move in the direction of the arrow 40 at the same speed as the conveyor belt 24.

It will now be appreciated that the operator standing in front of the table 10 may place the stock S on either the conveyor 16 or the conveyor 15 and if placed upon the conveyor 16, such will be inverted and dropped onto the belt 24 to move back beneath the splice table 10 with the cords thereof simply now biased in the opposite direction. Since tires built with bias cord fabric have the successive plies thereof with the cords biased in the opposite directions, it can now be seen that the operator can obtain such opposite bias on the conveyor 15 in a very simple manner.

The stock S or tire fabric material may pass from the conveyor 15, no matter whether initially fed onto the belt 24 or the belt conveyor 16, onto an inclined loading and centering conveyor shown generally at 42 which cooperates with a tire servicer shown generally at 43 accurately and quickly to feed the tire fabric material into a selected one of the storage units thereof at zero tension. The servicer 43 may for reference purposes be labeled servicer No. 1. Such servicer as seen more clearly in FIG. 2 comprises two ferris wheel units 44 and 45 which are mounted for rotation or indexing movement about horizontal shafts 46 and 47, respectively, such shafts being mounted on frame 48 which is in turn mounted on a turntable so that the entire servicer may be rotated about a vertically extending axis to present either ferris wheel to drum 49 of the tire building machine or to the loading and centering conveyor 42. The drum type tire building machine 49 may include a frame or housing 50 which also supports the associated servicer for swinging movement about its vertical axis.

Each ferris wheel includes a plurality of tire building material storage and dispensing units 52, each of which includes a stock roll 53 and a liner roll 54. A liner L extends from the liner roll 54 of each unit about a roller 55 mounted at the distal ends of a pair of arms 56 and then in an upwardly inclined manner, for the unit in the loading or unloading lowermost position, to form a loading apron extending about the underside of the stock roll 53. The arms 56 may be extended and retracted to and from the periphery of the ferris wheel and this may be accomplished by the driving mechanism of the servicer 43. Thus the storage unit 57, when indexed to the loading position, may have the arms 56 thereof extended to form the loading apron with the liner L extending in an upwardly inclined manner to the stock roll. In such extended position of the arms 56, the liner L will constitute a substantially planar continuation of the top surface of the loading and centering conveyor 42. When the arms are retracted, the tire material will simply pass over the top of the loading and centering conveyor onto a belt conveyor 60 mounted on stand 61 adjacent the housing 50 of the servicer and tire building machine. The conveyor 60 which is in line with the conveyors 15, 16 and 42 may lead to a further loading and centering conveyor servicing a further tire servicer in turn servicing a further tire building machine.

Accordingly, a quite lengthy conveying and sorting line is provided with the operator at the splice table 10 being able to provide strips of stock which can then be fed to a selected storage unit in a selected ferris wheel of a selected tire servicer for eventual application to the drum of the tire building machine. The distribution and sorting of the various tire building materials can be done automatically by means of a punched card mechanism and it will, of course, be appreciated that the splicing of the various segments of tire material together to form the continuous strips may also be done automatically by a butt or lap splicing mechanism.

Referring now to FIG. 1A, which it is noted is shown broken away, the conveyor belt 60 may pass on to a further loading and centering conveyor servicing a further tire servicer etc. with the penultimate servicer being provided adjacent thereto with a conveyor 63 which may be identical in form to the conveyor 60 which will deposit the tire materials thereon onto a loading and centering conveyor 64 which may then load the materials into a servicer, which may be termed servicer No. 8 for convenient reference purposes. Such servicer No. 8 may be substantially identical in form to the servicer No. 1 shown in FIG. 1 and provides convenient placement of tire building materials on the drum 66 of the adjacent tire building machine. Thus a conveying and sorting line is provided for tire building machines which may serve, for example, eight servicers as in the illustrated embodiment although it will be appreciated that fewer or more servicers may be provided in the line. However, the terminal servicer No. 8 instead of having a conveyor adjacent thereto is provided with a stand 67 having a drive unit 68 therein for driving the loading and centering conveyor 64 as will hereinafter be described in more detail.

Referring now more particularly to FIGS. 4, 5 and 7, the loading and centering conveyor 42, typical of all of the conveyors in the line, comprises a frame 70 having a top plate 71 at each side thereof between and above which pass a plurality of endless conveyor belts 72 trained about pulley 73 at the upper or exit end of the conveyor and about idler pulley 74 at the lower or loading end of the conveyor. The idler pulley 74 is mounted on shaft 75 which may be adjusted longitudinally of the conveyor by adjusting screws to place and hold the idler pulley in the desired take-up position. In this manner, the tension of the belts 72 can closely be controlled. V-shape transverse frame members 79, 80 and 81 extend between the side frames of the conveyor to the side plates 83 beneath the top plates 71.

At the lower or loading end of the conveyor, the side frame top plates 71 are provided with upstanding triangular support plates 84 at each side of the conveyor supporting therebetween guide rods 85 and 86 with a double lead screw 87 therebetween. Blocks 88 are mounted on the guide rods 85 and 86 for sliding movement therealong and include nuts therein in threaded engagement with the screw 87. As indicated in FIG. 2, there are two such blocks mounted on the guide rods 85 and 86 and in engagement with the screw 87. Such screw is provided with a sprocket 89 having drive chain 90 trained thereabout as well as about sprocket 91 driven by drive motor 92. Such motor may be mounted on one of the plates 84 as indicated. A rectangular tubular frame member 93 extends between the plates 84 and may be provided with a scale cooperating with pointers P on the blocks 88. The blocks are so arranged upon the transversely extending guide rods and double lead screw that rotation of the screw in one direction will cause the blocks to move apart and in the opposite direction cause the blocks to move toward each other.

Each block has mounted thereon an edge sensing unit 94 which includes a light source 95 and a photo sensitive cell 96 which cooperate with a reflective surface 97 supported on frame 98 extending from the discharge end of the conveyor 15. In this manner, the unit 94 will detect the presence or lack of presence of the edge of the stock S therebeneath as it passes from the conveyor 15 onto the lower or loading end of the conveyor 42. By energization of the motor 92, the lateral spacing of the units 94 can thus be adjusted depending upon the width of the stock being fed therepast. The lateral spacing of units 94 is automatically set by the bias cutter operator when track 6 is set to the desired width of cut. The lights also automatically adjust themselves for minor variations in width of material passing through.

Referring now more particularly to FIGS. 7 and 9, extending from the lower end of the conveyor 42 are two L-shaped side plates 100 and 101 having tubular frame member 102 extending therebetween with a brace plate 103 also being provided. The plates 105 on which shaft 75 is mounted may be adjusted longitudinally of the frame 70 of the conveyor by means of the slots 104 in plates 105 and holes in plates 100 and 101 of frame 70. The nut and bolt assemblies 106 serve to lock the frame in the proper position to adjust pulley 74 and tension belts 72 as desired.

Projecting from the tubular cross beam 102 are two rollers 108 and 109 which are mounted on plates 110 and 111, respectively, supported on frame 112 of the conveyor 15. A piston-cylinder assembly 113 has its blind end pivoted at 114 to bracket 115 secured to the frame 112 with the rod 116 thereof being pivoted at 117 to the tubular cross frame 102. It can now be seen that in this manner, extension of the piston-cylinder assembly 113 will cause the lower or loading end of the conveyor 42 to move to the left as seen in FIG. 9 and retraction of such piston-cylinder assembly 113 will cause the same to move to the right as seen in FIG. 9.

A bracket plate 120 extends upwardly from the transverse frame 102 as seen in FIG. 7 supporting post 121 having light source 122 on the top thereof. Such light source is directed to light sensitive cell unit 123 having, in the illustrated embodiment, four light sensitive cells 125 vertically arranged one above the other. The unit 123 is arranged so that the light sensitive cells will be vertically aligned with one of the narrow openings between the slightly laterally spaced belts 72 and is mounted in housing 126 beneath such belts while the light source 122 is above the belts.

It can now be seen that as the stock S drops from the conveyor 15 onto the loading end of the conveyor 42, the flexure or fold thereof indicated at 127 will block or partially block the light source 122 from the cells 125. Unit 123 may then be employed for controlling the speed of the conveyor 42 gradually to increase or decrease the speed in response to the flexure of the stock S dropping thereon. Thus if the conveyor 42 is moving too fast, the stock flexure 127 will move upwardly exposing all of the light cells 125 to the light source 122. This will then slow the conveyor down until the proper number of cells is shadowed. Conversely, if the conveyor 42 is moving too slowly, the stock flexure 127 will shadow all of the cells 125 causing the conveyor 42 to speed up. In this manner, a synchronization of the drives between the conveyors 15 and 42 is obtained.

Referring now to FIGS. 3 and 4, the drive for the intermediate conveyor 42 is obtained from motor 130 driving through timing belt 131 a speed reducer 132 having output shafts 133 and 134. For servicer No. 8 the shaft 134 is provided with a pulley 135 having a belt trained thereabout which is operative to drive servicer 43 or the servicer No. 1 in the line. The other output shaft 133, which may be an extension of the input shaft, drives line shaft 136 through chain 137 trained about sprockets 138 and 139 on the shafts 133 and 136 respectively. As seen in FIG. 1A, the line shaft 136 may serve to drive a gear box 140 at the opposite end of conveyor 60 or the penultimate conveyor 63 illustrated in FIG. 1A which drives the opposite conveyor pulley 141 through chain 142. The belt 60 is thus driven from motor 130 and such belt drives end pulley 144 mounted on shaft 145 journalled in conveyor frame plate 146. Such frame plate 146 is mounted on the conveyor frame by means of the slot and fastener connection shown in FIG. 4 facilitating adjustment and proper tensioning of belt 60.

The shaft 145 extends beyond the frame plate 146 and is provided with a sprocket 147 and two parallel arms 148 and 149 which are pivotally mounted on the extension of shaft 145. A relatively short shaft 150 is provided extending between the distal ends of the arms 148 and 149 and such shaft is provided with two sprockets 151 and 152 which may be keyed to the shaft 150 for rotation therewith while the shaft may be mounted on the arms 148 and 149 in bearing structures. A chain 153 is trained about the sprocket 147 and the sprocket 151 and a chain 154 is trained about the sprocket 152 and sprocket 155 mounted on shaft 156 of the conveyor drive pulley 73. A further arm 157 extends from the shaft 150 to the shaft 156 so that an articulated drive linkage is provided between the shaft 145 of the pulley 144 of the conveyor 60 and the shaft 156 of the pulley 73 of the conveyor 42. Thus the motor 130 drives the intermediate loading conveyor 42.

The speed of the motor 130 may be controlled by the photocell unit 123 gradually to speed up or slow down depending upon the flexure of the stock dropping onto the lower or loading end of the conveyor 42. There will be sufficient play in the arms and their bearings to permit conveyor 42 to pivot about pin 160 extending upwardly from frame 161 of the conveyor 60 and received in bushing 162 in plate 163 secured to the underside of tubular transverse frame 164 extending between inclined braces 165 and 166 extending upwardly to the frame 70 of the conveyor 42. Vertical braces 167 may also be provided with a tubular transverse cross brace 168 therebetween. Rollers 170 and 171 are mounted at the ends of the transverse frame 164 on side plates 172 and 173, respectively, with such rollers riding upon the top flange of angles 174 and 175 of the frame 161.

The vertical axis of the pin 160 thus is beyond the discharge end of the conveyor 42 and extends upwardly through the longitudinal center of apron 180 formed by the liner L extending about the roller 55 at the distal ends of the arms 56 of the storage unit 57 of the ferris wheel 45. Accordingly, the piston-cylinder assembly illustrated in FIG. 9 at 113 will be effective to swing the conveyor 42 in a horizontal plane about the vertically extending axis of the pin 160 which extends through the apron forming liner L at the longitudinal center thereof.

Thus, for servicers 1 through 7, the belts 60 or 63 will drive pulley 144 on shaft 145 on which sprocket 147 is fixed. Then sprocket 147 will drive pulley 73 of conveyor 42.

A nylon rotary brush 190 is mounted on shaft 191 supported at the outer or discharge end of the conveyor 42 and such brush may be driven by a chain drive from the shaft 156 to rotate at a speed slightly faster than the stock travel rate. Such brush may be of the spiral wound nylon brush strip type and serves to flick the end of the stock from the conveyor 42 onto the liner L when the arms 56 are in their lower or loading position so that the roller 55 is substantially adjacent the brush 190 as indicated in FIG. 4. It will be appreciated that when the arms 56 are retracted, the stock will then simply pass over the top of the brush 190 and drop onto the conveyor 60 for movement to the next servicer or selected servicer in the line. Thus the loading and centering conveyor 42 is fixed as to its angle of inclination and the movement of the arms 56 on the ferris wheel storage units are employed to obtain the selective loading of the ferris wheel storage units from the conveyor line. Such loading conveyor constitutes a substantially planar continuation of the loading apron 180 when the arms 56 are extended even though the angle of inclination of the apron will vary depending on the fullness of the stock storage roll. The conveyor 42 is, however, swingable about a vertical axis by the action of the piston-cylinder assembly 113 which is controlled by the edge sensing units 94, the pivot axis 160 being vertically aligned with the apron 180 at a point on the longitudinal center thereof.

Referring now to FIGS. 2, 4 and 5, it will be seen that the loading and centering conveyor 42 is provided with two photocell units 200 and 201 which include light sources 202 and 203 and photo sensitive cells 204 and 205, respectively. Such light sources and cells are aligned with each other in a direction normal to the plane of the conveyor belts 72 and are mounted on tubular support rods 206 extending from brackets 207 and 208 which are secured to the frame 70. The unit 200 is employed to detect the lack of presence of the stock on the conveyor 42 to stop the conveyor and to cause the ferris wheel 45 to index. Also, the arm 56 are retracted.

The unit 201 detects the arrival of stock on the conveyor and causes the conveyor to stop and the arms 56 are then caused to extend to an apron forming position so that the liner L will receive the stock advancing up the conveyor 42 in the direction of the arrow 209 as seen in FIG. 4 when the conveyor is started by the arms 56 dropping. The unit 201 also is employed to detect the lack of presence of stock on that portion of the conveyor 42 thus detecting when the material has left the conveyor 15 so that the units 94 may automatically be adjusted to the width of the next line of stock coming from the splice table 10. The operator will set the proper width, but the motor 92 will not be energized to set the units 94 for such width until the preceding width stock has cleared the photocell unit 201 of the conveyor 42. A similar sequencing of the adjustment of the edge sensing unit 210 of subsequent loading and centering conveyors as seen in FIG. 1A may likewise be preset but will not automatically be adjusted until the preceding stock has cleared the unit 201 on the conveyor 64. Accordingly, the edge detecting units, which, of course, cause the loading and centering conveyors to swing about their vertical pivots, will be set to the selected width only after the preceding width has cleared.

As seen in more detail in FIG. 5, a roller 214 supported on depending arms 215 from the frame 70 may be employed to support the belts 72 on their return flight. Although not herein illustrated, it will be appreciated that there is provided a synchronizing drive for the liner L so that power may be supplied to such liner from the drive motor 130 through output shaft 134 on reducer 132 (see FIG. 3) causing the liner L to move in the direction of the arrow 216 seen in FIG. 4 at the same surface speed as the belts 72 moving in the direction of the arrow 209. Reference may be had to the aforementioned copending application of Edwin E. Mallory and Armindo Cantarutti, Ser. No. 162,729, entitled "Tire Building Apparatus," filed Dec. 27, 1961, now Patent No. 3,230,123, for an illustration of a synchronizing drive that may be employed with the present invention. Accordingly, it will be appreciated that the light source and photocell speed control unit shown in FIG. 7, which gradually increases or decreases the speed of the conveyor 42 dependent upon the degree of flexure of the stock S dropping thereon, controls the speed of the motor 130 which not only controls the speed of the conveyor 42 through the articulated arm drive linkage shown in FIG. 4, but also the speed of the conveyor belt 60 as well as the speed of the liner L which is synchronized with the speed of the belt 72.

Referring now to FIGS. 10 and 11, the drive for the loading and centering conveyor 64 for the terminal servicer No. 8 may be obtained from the drive unit 68 which comprises motor 220 driving reducer 221 through belt 222. The speed reducer is provided with an output shaft 223 having pulley 224 thereon for driving the servicer No. 8 in the same manner that pulley 135 drives servicers 1 through 7. Output shaft 225 has sprocket 226 thereon with chain 227 trained thereabout. The chain 227 passes about sprocket 229 mounted on shaft 230 journalled on frame plate 231 and then beneath sprocket 232 and finally upwardly about sprocket 233, the latter being mounted on shaft 234 also journalled on the frame plate 231. The sprocket 232 is mounted on shaft 236 which extends through the plate 231 and also has sprocket 237 mounted thereon. A chain 238 is trained about the sprocket 237 and sprocket 239 mounted on shaft 240 which is supported by arms 241 and 242 extending between the shaft 236 and such shaft 240. Arm 245 extends between the shaft 240 and the shaft 156 at the upper end of the conveyor 64. A drive chain 247 interconnects sprockets 248 and 249 on the shafts 240 and 156, respectively, to provide an articulated drive linkage between the shaft 236 driven by motor 220 and the drive shaft 156 of the conveyor 64 for servicer No. 8. In this manner, the conveyor 64 is driven directly from the motor 220 rather than through a conveyor belt and line shaft drive as in the conveyors for services 1 through 7. The conveyor 64 is otherwise identical in form to the conveyors 42 and such conveyor is pivoted at 160 to the stand 67 for horizontal swinging movement about a vertical axis extending through the liner L formed by the extended arms of the selected unit of the terminal servicer.

It can now be seen that there is provided a simplified compact loading and centering conveyor for tire servicers which will deposit the tire building materials properly centered and at zero tension in the various storage units of such servicer.

Other modes of applying the principle of the invention may be employed, change being made as regards the details described, provided the features stated in any of the following claims or the equivalent of such be employed.

We, therefore, particularly point out and distinctly claim as our invention:

1. In combination, a drum type tire servicer having a plurality of tire material storage drums, a liner for each drum, a pair of pivotally mounted arms cooperating with each liner to form an inclined loading apron for the respective drums, a loading conveyor constituting a substantially planar continuation of the loading apron when said arms are properly pivoted, means pivotally mounting said loading conveyor for horizontal swinging movement about a vertical axis extending through the loading apron at a point on the longitudinal center thereof when said apron is in loading position, and means operative to control such swinging movement to align the materials with the loading conveyor at the distal end thereof.

2. The combination set forth in claim 1 including roller means supporting said loading conveyor at the entry end thereof for such horizontal swinging movement, power means for horizontally swinging said loading conveyor, and means responsive to the position of stock entering said loading conveyor operative to energize said power means.

3. The combination set forth in claim 1 including a belt drive pulley at the discharge end of said loading conveyor, and an articulated drive linkage connected to said drive pulley for driving said loading conveyor.

4. The combination set forth in claim 1 including a rotary brush at the discharge end of said loading conveyor adapted to be rotated at a surface speed faster than the surface speed of said loading conveyor.

5. The combination set forth in claim 1 including means responsive to the position of such tire material on said loading conveyor operative to pivot said arms to form said inclined loading apron.

6. The combination set forth in claim 4 wherein said loading conveyor has a pulley at the discharge end thereof, a shaft supporting said pulley, and means operative to drive said brush from said shaft in the same direction of rotation as said pulley to lift the tire material over the top of said brush.

7. In combination, a plurality of tire servicers having loading aprons, a conveyor line for feeding tire building materials to a selected one of said servicers including an upwardly inclined loading and centering conveyor for each of said servicers, means operative to swing each loading and centering conveyor about a vertical axis beyond the upper end thereof extending through the center of the servicer loading apron when the latter is positioned to receive material from said loading and centering conveyor, and means operative to control such swinging movement to align the materials with the loading conveyor at the distal end thereof.

8. The combination set forth in claim 7 wherein each loading and centering conveyor is upwardly inclined, support means extending downwardly and beyond each conveyor for supporting the same for such swinging movement, roller means at such distal end of each conveyor also supporting the same for such swinging movement, and power means operative thus to swing each conveyor.

9. The combination set forth in claim 8 including means responsive to the position of tire building materials entering each loading and centering conveyor operative to energize said power means.

10. The combination set forth in claim 9 including means responsive to the flexure of such tire building materials being deposited on each loading and centering conveyor to control the speed thereof.

11. The combination set forth in claim 10 wherein said last mentioned means comprises a light source and a plurality of vertically oriented light sensitive cells operative to sense the degree of flexure of such tire building materials when deposited on each conveyor.

12. In combination, a plurality of tire servicers including an inclined loading apron movable to a loading position, a conveyor line for feeding tire building materials to a selected one of said servicers including an inclined loading and centering conveyor for each of said tire servicers adapted to feed tire materials onto said aprons when in a loading position, means pivotally mounting said loading and centering conveyors for horizontal swinging movement about a vertical axis extending through the respective loading apron at a point on the longitudinal center thereof when said apron is in loading position, and means operative to control such swinging movement to align the materials with the loading conveyor at the distal end thereof.

13. In combination, the drum type tire servicer having a plurality of tire servicer storage drums, a liner for each drum, a pair of pivotally mounted arms cooperating with each liner to form an inclined loading apron for the respective drums, a loading conveyor constituting a substantially planar continuation of the loading apron when said arms are properly pivoted, and a rotary brush at the discharge end of said loading conveyor adapted to be rotated at a surface speed faster than the surface speed of said loading conveyor to lift the material onto the loading apron.

14. The combination set forth in claim 13 wherein said loading conveyor has a pulley at the discharge end thereof, a shaft supporting said pulley, and means operative to rotate said brush from said shaft in the same direction of rotation as said pulley.

References Cited

UNITED STATES PATENTS

| | | | |
|---|---|---|---|
| 2,625,198 | 1/1953 | Bostwick | 156—406 |
| 2,671,495 | 3/1954 | Iredell et al. | 156—406 X |
| 3,017,312 | 1/1962 | Kraft | 156—406 X |
| 3,142,603 | 7/1964 | Parshall et al. | 156—405 |
| 3,216,879 | 11/1965 | Mallory et al. | 156—406 |
| 3,230,132 | 1/1966 | Mallory et al. | 156—406 |

FOREIGN PATENTS 556,603  4/1958  Canada.

EARL M. BERGERT, *Primary Examiner.*

C. B. COSBY, *Assistant Examiner.*